(No Model.) 8 Sheets—Sheet 1.
C. MESSICK.
PASSENGER RECORDER.
No. 581,603. Patented Apr. 27, 1897.
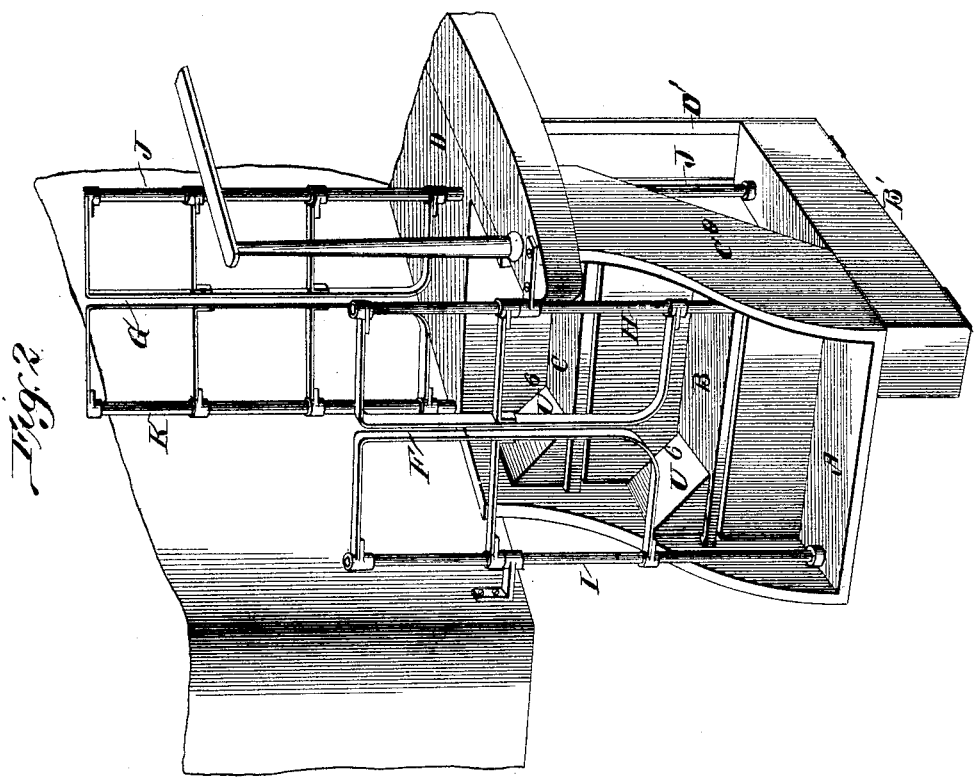
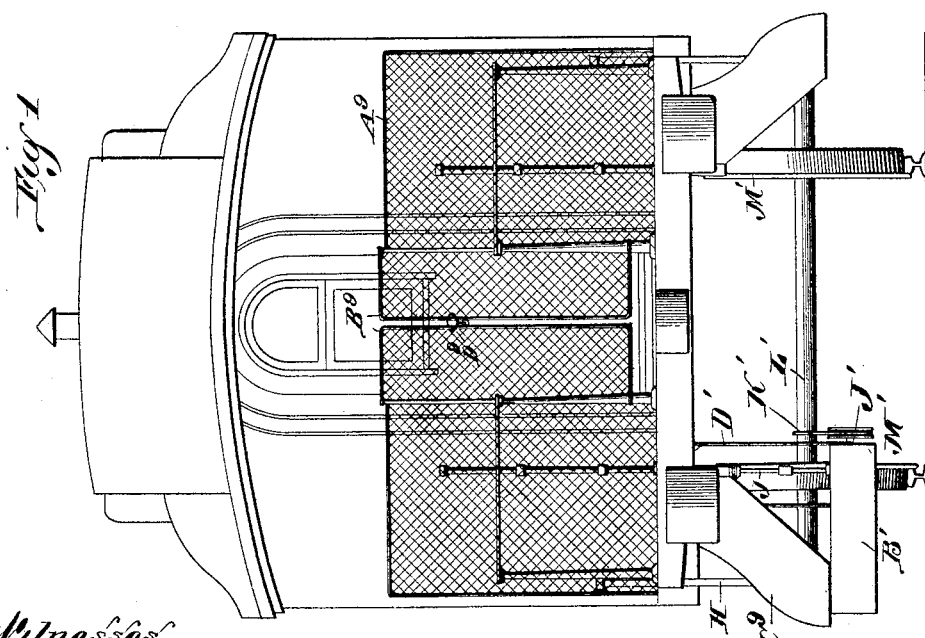
Witnesses
J. L. Tunison
Leonora Wiseman
Inventor
Charlton Messick
By Edward Reitz his atty.

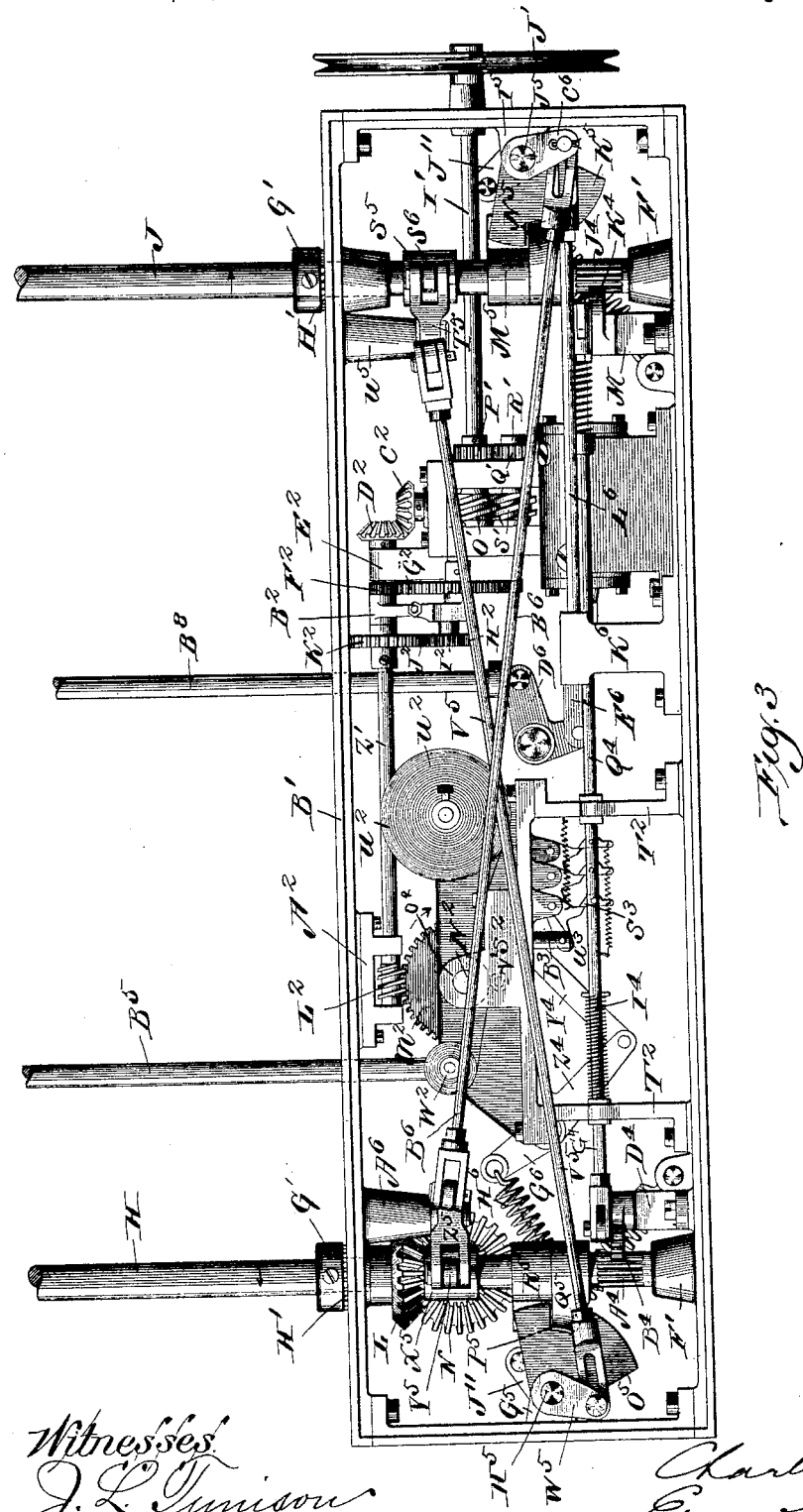

(No Model.) 8 Sheets—Sheet 3.
C. MESSICK.
PASSENGER RECORDER.
No. 581,603. Patented Apr. 27, 1897.
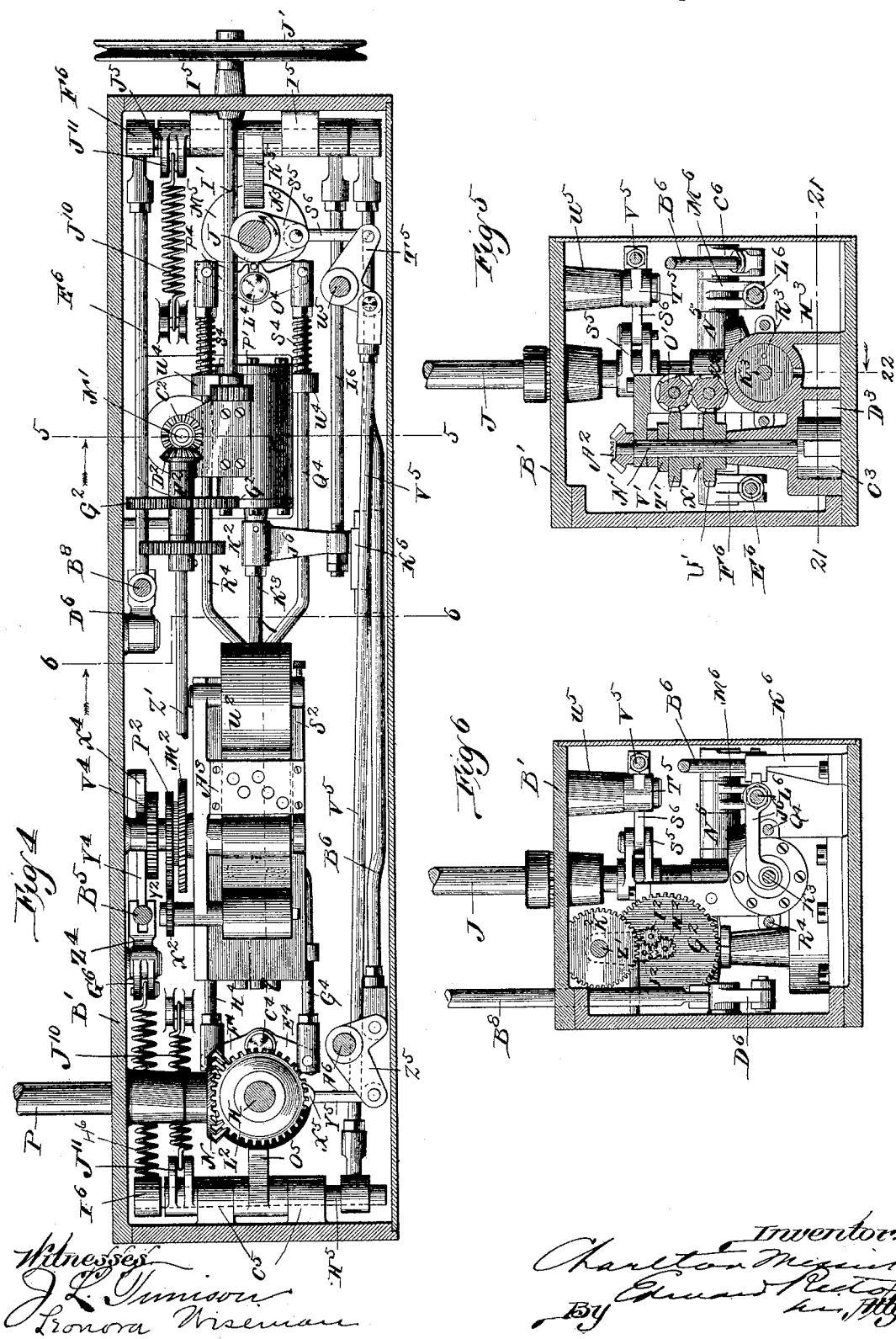

(No Model.) 8 Sheets—Sheet 4.
C. MESSICK.
PASSENGER RECORDER.
No. 581,603. Patented Apr. 27, 1897.
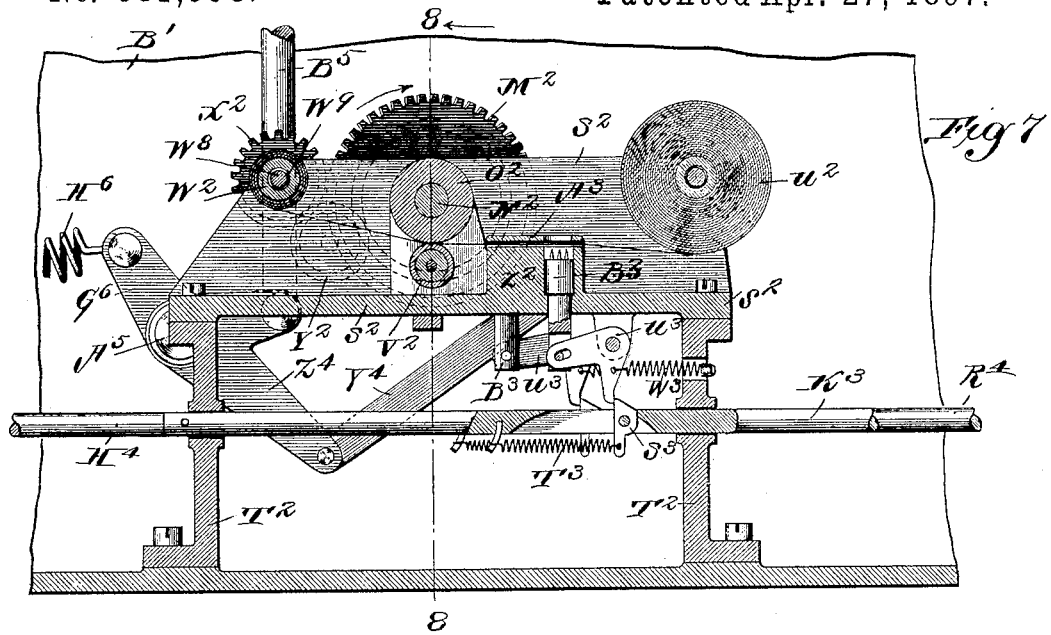
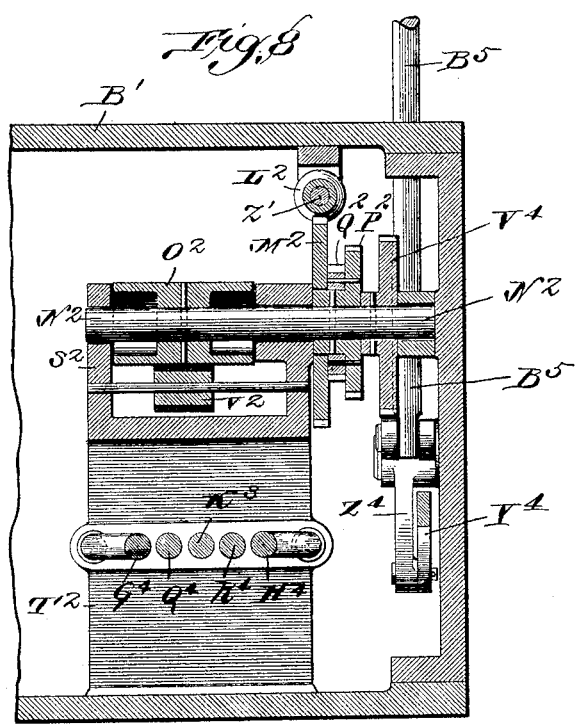

(No Model.) 8 Sheets—Sheet 5.
C. MESSICK.
PASSENGER RECORDER.
No. 581,603. Patented Apr. 27, 1897.
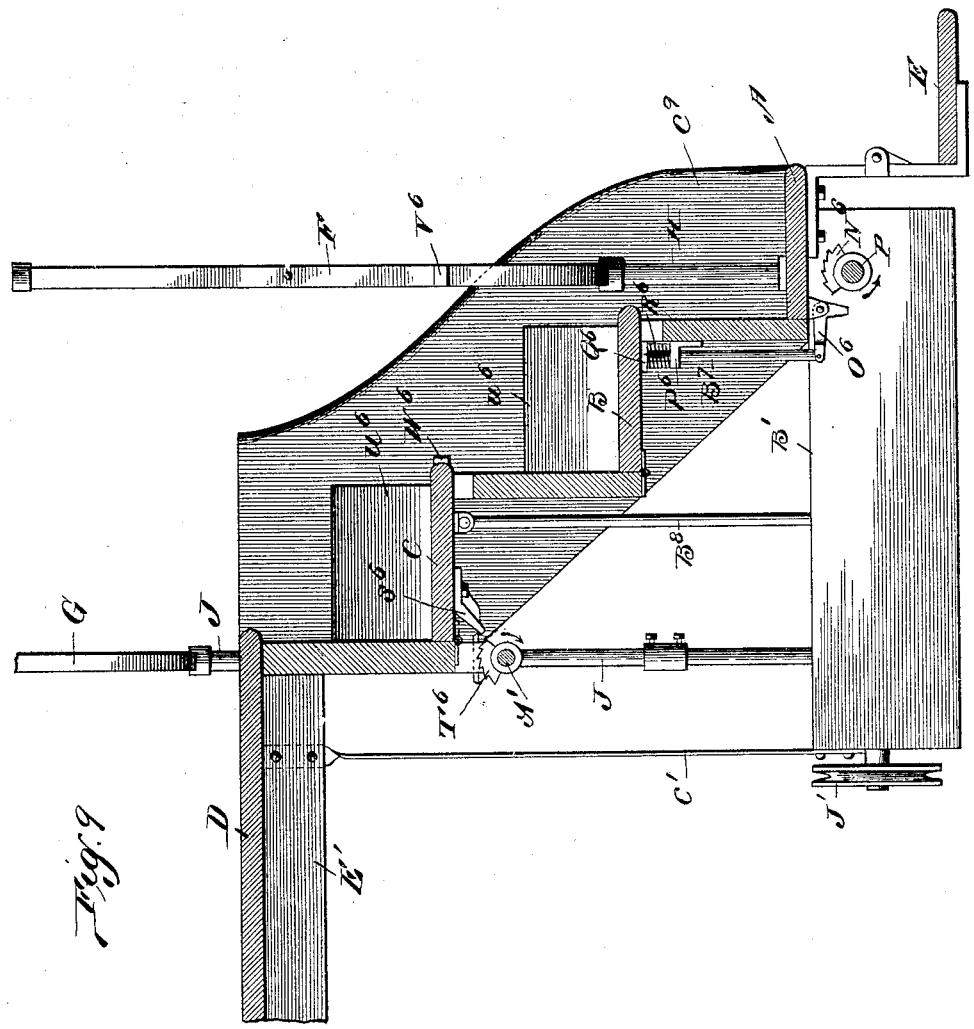

(No Model.) 8 Sheets—Sheet 6.
C. MESSICK.
PASSENGER RECORDER.
No. 581,603. Patented Apr. 27, 1897.
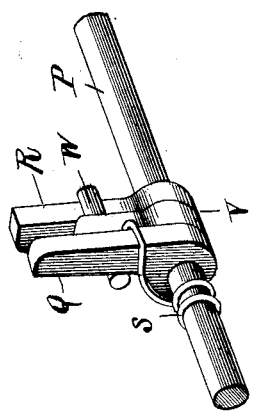
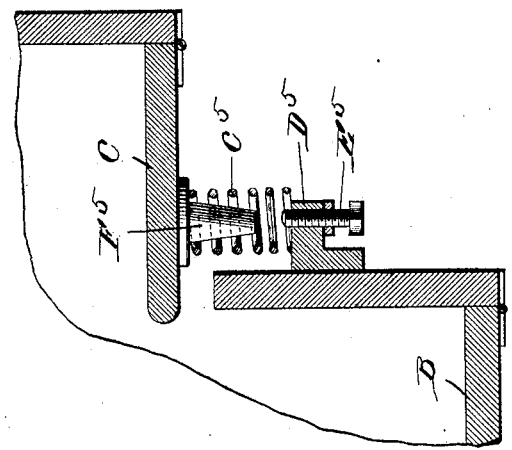
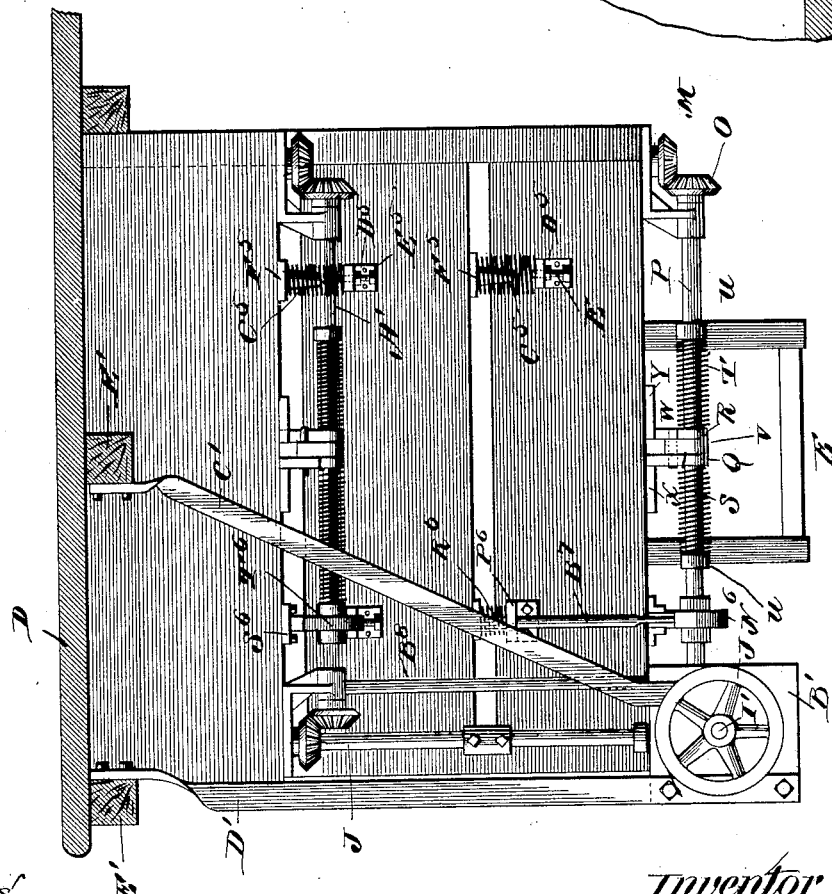
Witnesses:
J. L. Tunison
Leonora Wiseman
Inventor
Charlton Messick
By Edward Ritter
his Atty

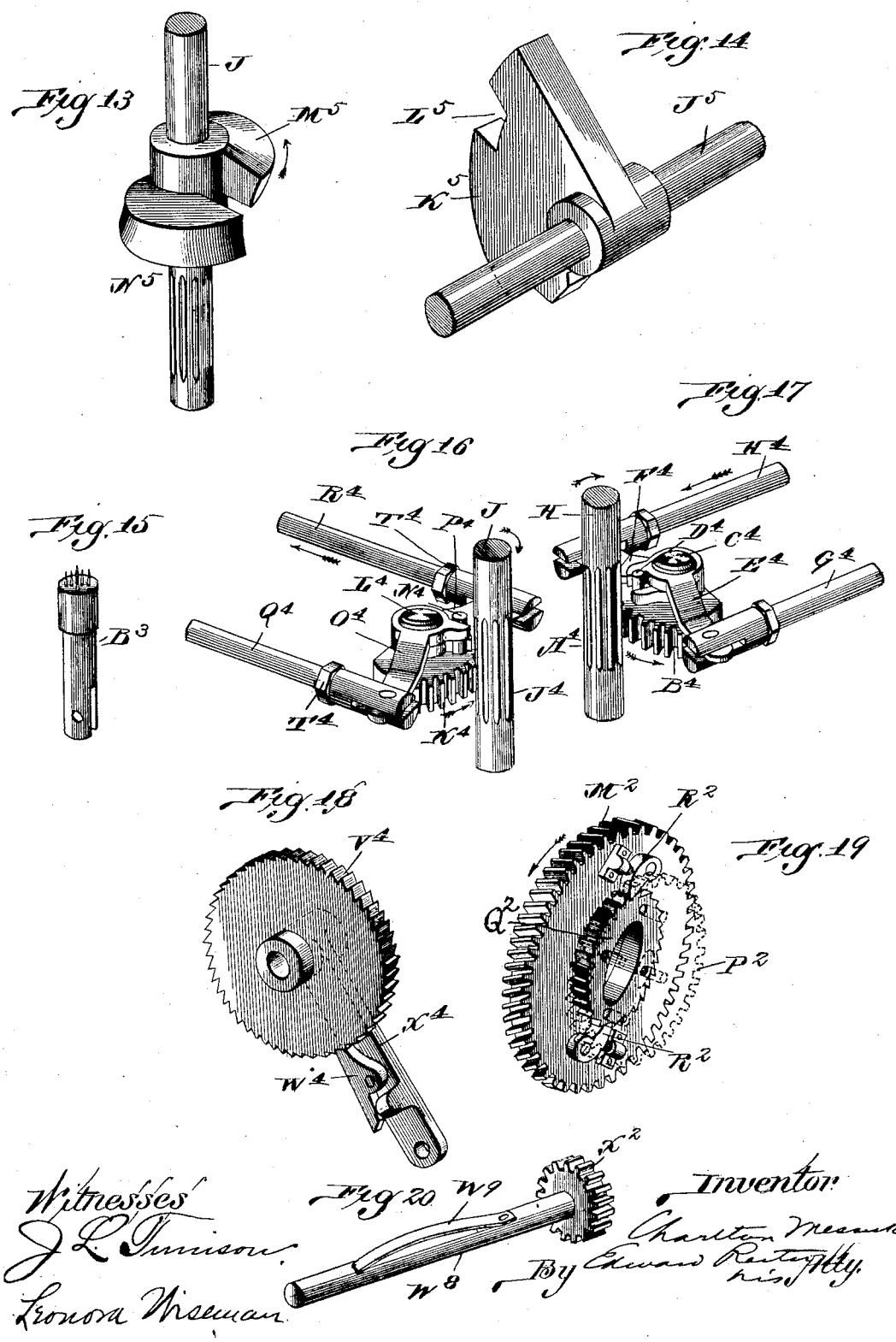

(No Model.) 8 Sheets—Sheet 8.
C. MESSICK.
PASSENGER RECORDER.
No. 581,603. Patented Apr. 27, 1897.
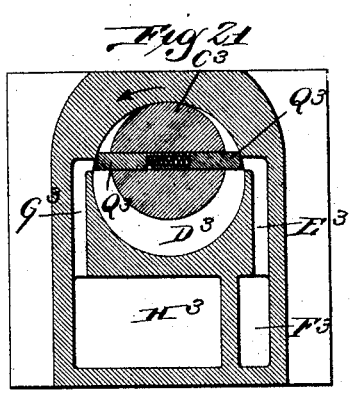
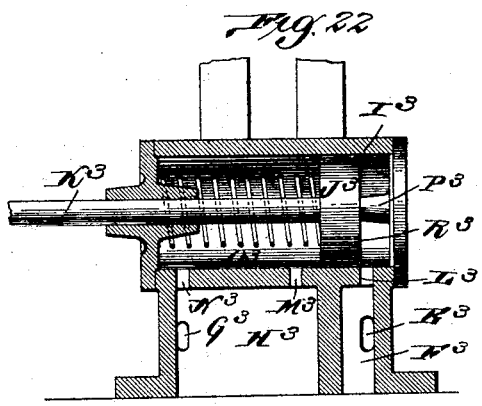
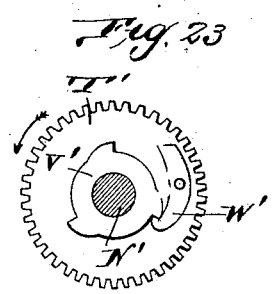
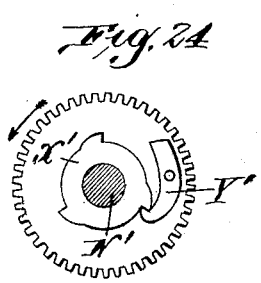
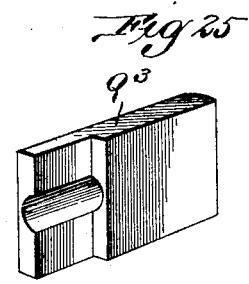
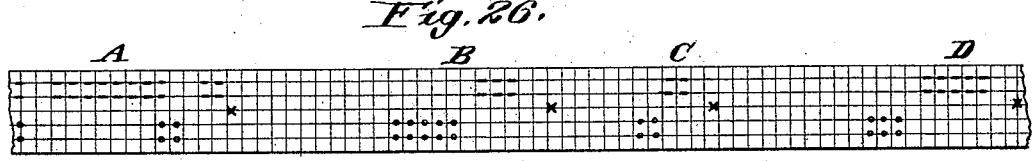
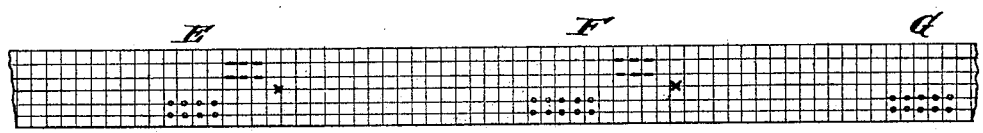
Witnesses.
Inventor

UNITED STATES PATENT OFFICE.

CHARLTON MESSICK, OF ST. LOUIS, MISSOURI.

PASSENGER-RECORDER.

SPECIFICATION forming part of Letters Patent No. 581,603, dated April 27, 1897.

Application filed July 18, 1896. Serial No. 599,746. (No model.)

*To all whom it may concern:*

Be it known that I, CHARLTON MESSICK, a citizen of the United States, residing at the city of St. Louis, in the State of Missouri, have invented a certain new and useful Improvement in Passenger-Recorders, of which the following is a description, reference being had to the accompanying drawings, forming part of this specification.

My invention has for its object the provision of an automatic register or recorder which will make and preserve a record of all passengers entering and leaving a car of a railway passenger-train and which will also indicate the various points at which the passengers entered and left the car, and consequently the distances traveled by them, whereby an examination of the record at the end of a trip will disclose the passenger mileage, which must be accounted for by the conductor with tickets, passes, and cash fares.

The register is secured in a suitable position upon the car adjacent the entrance thereto and is provided with a paper record-strip, which is automatically advanced by the movement of the train at a speed proportionate to that of the train. Upon this record-strip a record is automatically made by a punching device or other suitable means at the entrance of each passenger and another different record at the exit of each passenger. A further record is preferably made upon this strip by each starting or stopping of the train. Inasmuch as the distance which the record-strip is moved is directly in proportion to the distance moved by the train, it follows that the records above mentioned upon such strip will indicate the distances traveled by the passengers upon the train, from which in the manner hereinafter explained the passenger mileage for which the conductor must account may be readily ascertained.

The records of the entrance and exit of passengers are effected by means of gates which are provided at each entrance to the car and which must be opened and closed at the entrance or exit of each passenger. These gates are so connected with the recording devices as to actuate the latter and effect one sort of record upon the paper strip when they are opened in one direction to permit the entrance of a passenger to the car and another sort of record when they are opened in the opposite direction to permit the exit of a passenger. Two gates or two pairs of gates are provided at each entrance to the car, together with locking devices intermediate such gates, which compel the gates to be opened and closed at the entrance or exit of each passenger, and consequently insure the making of the proper record upon the record-strip. There are also provided additional locking devices intermediate the gates and movable steps at the entrance to the car, by which opening of the gates, except by the actual entrance or exit of a passenger, is prevented.

Having thus indicated the general nature and purpose of my invention, I will proceed to a more detailed description of it by reference to the accompanying drawings, in which—

Figure 1 represents an end view of a passenger-car equipped with my register; Fig. 2, a detail perspective view of the left-hand corner and steps of the car in Fig. 1; Fig. 3, an enlarged side elevation of the register, the hinged side plate or door of the casing inclosing the same being removed; Fig. 4, a top plan view of the parts shown in Fig. 3 within the register-case, the latter being in section; Fig. 5, a vertical section approximately on the line 5 5 of Fig. 4; Fig. 6, a vertical section approximately on the line 6 6 of Fig. 4; Fig. 7, an enlarged sectional view through the recording devices, approximately on the line 7 7 of Fig. 4; Fig. 8, a cross-section approximately on the line 8 8 of Fig. 7; Fig. 9, a vertical section through the series of steps leading up to the platform of the car; Fig. 10, a sectional view in the longitudinal plane of the car, showing an elevation of the rear side of the steps and the parts carried thereby and adjacent thereto; Fig. 11, a sectional detail showing one of the hinged steps and one of the springs for supporting it; Fig. 12, a detail perspective view of the horizontal rock-shaft connecting the two gates of the lower pair with the arms mounted on said shaft; Fig. 13, a detail perspective view of the locking-arms upon one of the vertical rock-shafts; Fig. 14, a similar view of one of the locking-sectors on one of the horizontal rock-shafts; Fig. 15, a detail view of one of the punches; Figs. 16 and 17, detail perspective views of the gear-toothed segments actuated by the two vertical rock-shafts and the parts coöperating with such segments; Fig. 18, a detail view of the ratchet and the pawl-carrier and pawl of the paper-strip-feeding devices; Fig. 19, a perspective detail of the worm-gear and coöperating parts for driving the feed-rollers; Fig. 20, a perspective detail of the shaft upon which the storage-reel is mounted, showing the spring for frictionally holding the storage-reel to the shaft and the pinion fast upon the end of the shaft; Fig. 21, a sectional detail of the oil-pump on the line 21 21 of Fig. 5, and Fig. 22 another section of the same on the line 22 22 of Fig. 5; Figs. 23 and 24, detail plan views of the worm-wheels and clutch devices between the same and the shaft upon which they are mounted; Fig. 25, a perspective detail of one of the radial piston-plates of the rotary piston of the oil-pump, and Fig. 26 a plan view of a piece of the record-strip.

The same letters of reference are used to indicate corresponding parts in the several views.

Passenger-cars are usually provided with steps at the four corners of the car, by which passengers ascend to and descend from the platforms at the opposite ends of the car, but it frequently happens that the steps at only one corner of the car, or, at most, the steps at the two corners on one side of the car, are used during a trip in one direction.

I will describe my invention as applied to the steps at only one corner of the car, it being understood that the steps at the diagonally opposite corners of the car may also be provided with a register or that the steps at all four corners may be so provided.

As seen in Figs. 1, 2, 9, and 10, the car shown in the drawings is provided with three main steps A, B, and C, leading up to one side of the platform D at the end of the car. The lower step A is shown in Figs. 9 and 10 as carrying a supplemental hinged step E, which when not in use may be swung up over the step A. Arranged above the lower step A is a pair of swinging gates F, Fig. 2, while arranged above the outer edge of the platform D, which may be said to constitute the fourth step in the series, is a second pair of swinging gates G. The gates F are secured to and carried by a pair of vertical rock-shafts H I, journaled in bearings at opposite sides of the step A, while the gates G are carried by a second pair of vertical rock-shafts J K, journaled in suitable supports at opposite sides of the outer edge of the platform D.

By the action of springs hereinafter described the gates are yieldingly held in normal position across the step A and platform D to close the entrance to the car, but may be swung in either direction against the resistance of such springs to permit the entrance and exit of passengers. The rock-shafts H I of the lower pair of gates have secured to their lower ends, beneath the step A, beveled gears L M, Figs. 3, 4, and 10, which mesh with similar gears N O, secured upon the opposite ends of a rock-shaft P, journaled in bearings upon the under side of the step A. Loose upon this shaft, near its middle, are two upwardly-extending arms Q R, Figs. 10 and 12, to which are respectively secured the inner ends of two coiled springs S T, surrounding the shaft P and attached at their outer ends to collars U, fast upon the shaft. Fast upon the shaft, between the arms Q and R, is a third arm V, which carries a transverse pin W, projecting in front of the arm Q and in rear of the arm R. The stress of the spring S tends to throw the upper end of the arm Q forward, and its movement in that direction is limited by a stop X upon the under side of the step A, while the stress of the spring T tends to throw the upper end of the arm R rearward, and its movement is limited by a stop Y upon the under side of the step A. The stress of the spring S likewise tends to turn the shaft P rearward and rock the shafts H I to open the gates F inward, while the stress of the spring T tends to rock the shaft P forward and open the gates F outward. When the gates are opened outward, therefore, the spring S is put under tension, and when the gates are released the spring will restore them to normal position, while when the gates are opened inward the spring T will be put under tension and will serve to reset them when released. When the shaft P is turned rearward by the opening of the gates inward, the pin W upon the arm V will carry the arm Q rearward with the shaft, so that the tension of the spring S will not be affected by the turning of the shaft, and likewise when the shaft P is turned forward by opening the gates outward the pin W will carry the arm R forward with the shaft, so that the tension of the spring T will remain unaffected.

The rock-shafts J K of the upper pair of gates are likewise geared to a horizontal shaft A', Fig. 10, journaled in suitable bearings at the rear of the upper step C, which shaft is surrounded by coiled springs corresponding to the springs S T upon the lower shaft P and coöperating with similar arms upon the shaft and fixed stops engaged by said arms, so that the two upper gates are normally held in transverse position across the edge of the platform D, but are free to be swung in either direction against the stress of the springs upon the shaft A', as in the case of the lower pair of gates heretofore described.

The casing which incloses the recording devices consists of a rectangular box B', approximately square in cross-section and in the present instance of a length about four times its width and depth and secured at its outer end to the under side of the lower step A and side wall C⁹ of the steps and supported at its inner end by metal straps C' D', fastened at their lower ends to the inner end of the box B' and secured at their upper ends to the timbers E', upon which the platform D is built, Figs. 1, 2, 9, and 10.

The rock-shafts H and J, which support the right-hand gates of the respective pairs, extend downward into the register-box B', as seen in Fig. 3, and at their lower ends are seated in bearings F' upon the bottom plate of said box. Immediately above the top plate of the box B' the shafts H and J have secured upon them collars G', provided on their under sides with circular grooves for the reception of a series of balls H', whose upper sides fit in said grooves and whose lower sides fit in corresponding grooves formed in the surface of the top plate of the box B' or a bearing formed thereon. The weight of the shafts H and K and parts carried by them is partially supported upon these balls and friction in their movements to that extent relieved. The shaft H has secured upon it within the box B' the beveled gear L, which meshes with the beveled gear N upon the end of the shaft P, as heretofore described.

Projecting from the inner end of the register-box B' (right-hand end in Figs. 3 and 4) is a shaft I', having fast upon it a grooved pulley J', in which fits a driving cord or belt K', which passes around the axle L' of one of the pairs of wheels M' of the truck of the car, Fig. 1, by means of which the shaft I' is driven by the movement of the car and in a direction corresponding to such movement. This shaft is journaled near its outer end in the end plate of the register-box and at its inner end in a suitable frame fixed within the box. The shaft is employed to actuate the mechanism for advancing the paper record-strip and also to operate an oil-pump, for a purpose hereinafter explained. In performing these duties it is necessary that the shaft shall drive the feed-rollers for advancing the record-strip always in the same direction no matter in which direction the shaft itself may be turned by the movement of the car and that it shall likewise drive the rotary piston of the oil-pump always in the same direction, and to accomplish these results the following devices are employed intermediate the shaft I' and a vertical shaft N', Figs. 4 and 5, which is driven by the shaft I', and in turn drives the feed-rollers of the recording mechanism and the piston of the oil-pump. The shaft I' has fastened upon its inner end a worm O', Fig. 3, and also a pinion P', which latter meshes with a pinion Q', fast upon a short shaft R', journaled in the frame which supports the end of the shaft I', and carrying a worm S' beneath the worm O'. As seen in Fig. 5, the worm O' meshes with a worm-gear T', loosely mounted upon the vertical shaft N', while the worm S' meshes with a worm-gear U', also mounted loosely upon the shaft N'.

It will be understood from the foregoing that the revolution of the shaft I' in either direction will turn the worm-gears T' U' in reverse directions, so that no matter which way the shaft I' is turned one or the other of the worm-gears will be turned in what may be called a "forward" direction. By interposing suitable ratchet-and-pawl or clutch devices between the gears T' U' and the shaft N', so that when either of the gears is turned forward it will carry the shaft with it, while the other gear is turned idly rearward, it will be understood that the shaft will be constantly turned forward by one gear or the other. Fast upon the shaft N', immediately above the gear T', is a three-toothed disk or ratchet V', Figs. 5 and 23, with which coöperates a pawl W', pivoted upon the upper side of the gear T', while fast upon the shaft N', immediately above the gear U', is a similar disk or ratchet X', with which coöperates a pawl Y', pivoted upon the upper side of the gear U', Figs. 5 and 24. As will be understood from Figs. 23 and 24, when either of the gears T' U' is turned in the direction of the arrows it will carry the shaft N' with it, and inasmuch as one or the other of such gears is turned in such direction by the rotation of the shaft I' in either direction it follows that the shaft N' will be constantly turned in a forward direction while the car is moving in either direction.

The shaft N', by means of an intermediate speed-reducing gearing, drives a horizontal shaft Z', extending longitudinally of the register-box, Figs. 3 and 4, and journaled at its left-hand end in a bracket $A^2$, secured to the under side of the top plate of the box, and at its right-hand end in a bearing at $B^2$ upon the framework within the box.

The gearing intermediate the shaft N' and the shaft Z' is as follows: The shaft N' has fast upon its upper end a beveled pinion $C^2$, which meshes with a similar pinion $D^2$, fast upon the end of a short shaft journaled in a bearing $E^2$ and having fast upon its opposite end a small pinion $F^2$, which meshes with a gear-wheel $G^2$, Figs. 3, 4, and 6. Fast upon the shaft which carries the gear $G^2$ is a small pinion $H^2$, which meshes with a second pinion $I^2$, which in turn meshes with a third pinion $J^2$, which latter meshes with a gear-wheel $K^2$, fast upon the shaft Z', immediately at the left of its right-hand bearing $B^2$, so that by this intermediate train of gearing the shaft Z' is driven at a greatly-reduced speed by the shaft I'.

The shaft Z' has fast upon its left-hand end, Fig. 3, a worm $L^2$, which drives a worm-gear $M^2$, Figs. 3, 4, 7, and 8, which is loosely mounted upon the rotary spindle or shaft $N^2$ of one of the feed-rollers $O^2$ of the record-strip-advancing mechanism. Fast upon the shaft $N^2$, beside the gear $M^2$, is a gear-wheel $P^2$, Figs. 4, 8, and 19, which has fast upon its side a ratchet $Q^2$, engaged by spring-pressed pawls $R^2$, pivoted to the side of the gear $M^2$. The hub of the gear $P^2$ is shown as extending through the ratchet $Q^2$ and gear $M^2$ in Fig. 8, the gear $M^2$ being loosely mounted upon such hub instead of directly upon the shaft $N^2$.

It will be seen from the foregoing description that as the gear M² is turned in the direction of the arrows by the rotation of the shaft Z' it will carry the shaft N² of the feed-rollers with it, just as if the gear were fast upon said shaft. The purpose of the ratchet-and-pawl connection between the gear and shaft is to permit the shaft and feed-roller to be turned forward independently of the gear by the means and for the purpose hereinafter described.

The supply and storage reels for the record-strip, as well as the feed-rollers for advancing it, are mounted in a frame S², supported upon vertical brackets T², secured at their lower ends to the bottom plate of the register-box, Figs. 3, 4, 7, and 8. The supply of paper strip is carried in a roll U², mounted upon a spindle supported in the side plates of the frame S², and is led thence forward between the feed-roller O², above described, and a second feed-roller V², mounted beneath and bearing against the roller O², Figs. 7 and 8, and thence around the storage-reel W², which is mounted upon a spindle W³, having fast upon it a pinion X², Figs. 4 and 7, which pinion meshes with a second pinion Y², which in turn meshes with the gear-wheel P², fast upon the shaft N², as heretofore described, with the result that the storage-reel W² is turned to wind up the paper strip as it is advanced by the feed-rollers. The storage-reel W² is not tight upon the shaft or spindle W³, but is frictionally connected therewith by a spring W⁹, Fig. 20, so that as the size of the roll of paper upon the reel increases the reel can slip upon the shaft after taking up the length of strip advanced by the feed-rollers.

From the foregoing description it will be understood that the paper record-strip is advanced at a regular speed, proportionate to that of the train, and is always moved in a forward direction whether the train is moving forward or backward or the particular car in one direction or the other. In the machine upon which the present application is based the adjustment of the parts is such that the record-strip is advanced a quarter of an inch for each mile which the train or car moves, and lines ruled transversely across the strip one-quarter of an inch apart serve to indicate the mileage upon the strip. As the paper strip is drawn forward from the roll U² by the feed-rollers O² V² it passes across the upper side of a block Z², formed upon the upper side of the bottom plate of the frame S², Fig. 7, and beneath a plate A³, extending transversely across the upper side of said block, leaving a narrow passage between itself and the block, and secured at its opposite ends to the side plates of the frame S², as seen in Fig. 4. The block Z² is provided with a series of vertical holes in which are fitted punches B³, provided upon their upper ends with puncturing-points adapted when the punches are raised to pass through the record-strip and through holes in the plate A³ coincident with the punches. In the present instance there are five of the punches B³ in the relative positions indicated by the holes in the plate A³ in Fig. 4, the middle one of which punches is actuated by the starting of the train and may be called the "station-punch," while two of the other four punches are actuated by the respective gates, heretofore described, when said gates are swung inward to permit the entrance of a passenger, and the other two punches by said gates when the latter are swung outward to permit the exit of a passenger, all in the manner and by the means hereinafter explained.

The middle one or station-punch is actuated by the oil-pump heretofore referred to, and the said pump and the means for operating it and causing it to actuate said punch may be now described. This pump is shown more particularly in Figs. 5, 21, and 22, Fig. 21 being a horizontal section of the pump, approximately on the line 21 21 of Fig. 5, and Fig. 22 a vertical section approximately on the line 22 22 of Fig. 5. The pump consists of a rotary piston C³, eccentrically located in a cylindrical chamber D³, Fig. 21, which latter communicates by a passage E³ with a chamber F³ and by a passage G³ with a chamber H³. Located above the chambers H³ and F³ is a piston chamber or cylinder I³, containing a reciprocating piston J³, having a piston-rod K³ extending to the left through the head of the piston chamber or cylinder. The piston-chamber I³ communicates with the chamber F³ by a passage L³ and with the chamber H³ by two passages M³ and N³. A coiled spring O³, surrounding the piston-rod K³ and confined between the piston J³ and the front end of the piston-chamber, presses the piston rearward and tends to yieldingly hold it in the position shown in Fig. 22 against a stop P³, formed upon the inner face of the rear end of the piston-chamber. The rotary piston C³ contains two sliding piston-plates Q³, Figs. 21 and 25, pressed outward by a coiled spring interposed between them and adapted to bear against and closely fit the wall of the chamber D³ at diametrically opposite sides of the piston C³ as the latter rotates in such chamber. The piston C³ in the present instance is secured to the lower end of the shaft N', heretofore described, which shaft extends downward through the oil-pump casting and has its lower bearing therein, as seen in Fig. 5.

Under the construction above described, assuming the chambers of the oil-pump to be filled with oil, the operation of the pump will be as follows: As the piston C³ rotates in the direction of the arrow in Fig. 21 its plates Q³ will force the oil in the chamber D³ out through the port E³ and into the chamber F³, whence it will pass upward through the port L³ into the rear end of the cylinder I³ and drive the piston J³ forward until it passes the port M³, through which the oil will then escape into the chamber H³, and thence back through the passage G³ into the chamber D³. Inasmuch as the chambers are all substantially filled with oil a circulation of the oil will be established from the chamber $D^3$ through the passages and chambers, as above described, and back into the chamber $D^3$ through the passages $G^3$, so that as long as the piston $C^3$ continues to rotate the piston $J^3$ will be held in the forward position to which it has been forced, but as soon as the rotation of the piston $C^3$ ceases the spring $O^3$ will gradually force the piston $J^3$ rearward to normal position. To facilitate such rearward movement of the piston under the influence of the spring, the piston is provided with a small port $R^3$, Fig. 5 and dotted lines, Fig. 22, which permits the oil in the piston-chamber at the rear of the piston to pass to the front side of the piston as the spring forces the latter rearward, but is not large enough to prevent the piston being forced forward by the oil entering by the port $L^3$ while the pump is in operation. The port $N^3$, connecting the chamber $H^3$ with the front end of the piston-chamber $I^3$, also permits oil to pass upward from the chamber $H^3$ into the chamber $I^3$ at the rearward movement of the piston under the action of the spring.

From the foregoing description it will be understood that at each starting of the train the piston $J^3$ will be forced forward in the manner described and at each stopping of the train will return to normal position. Now the piston-rod $K^3$ extends forward, to the left in Figs. 3 and 4, through the supporting-brackets $T^2$ of the frame $S^2$, carrying the paper record-strip, as seen in Figs. 7 and 8. At a point beneath the position of the punches $B^3$ the piston-rod $K^3$ is slotted and has pivoted in it a dog $S^3$, which has connected to it a coiled spring $T^3$, which serves to yieldingly hold the dog in and return it to its normal position. This dog coöperates with a bell-crank lever $U^3$, pivoted to a support upon the under side of the frame $S^2$ and connected at its forward end by a slot and pin to the lower end of the middle one of the five punches $B^3$. A spring $W^3$, connected to the bell-crank $U^3$, serves to yieldingly hold it in normal position with its punch $B^3$ retracted. Now whenever the piston $J^3$ and its rod $K^3$ are forced forward by the starting of the train, in the manner above described, the dog $S^3$ will rock the bell-crank $U^3$ and force the punch $B^3$ upward and cause it to puncture the record-strip, the dog clearing the lower end of the bell-crank $U^3$ as the punch approaches its upward limit of movement, whereupon the spring $W^3$ retracts the bell-crank and punch. The piston-rod will be held in forward position so long as the train continues in motion, and when the train stops and the rod is retracted by the action of the spring $O^3$ the dog $S^3$ will yield as it contacts with the lower end of the bell-crank $U^3$ and ride under and clear the same and then be reset by the spring $T^3$ ready to again operate the punch at the next starting of the train and forward movement of the piston-rod.

From the foregoing it will be understood that in the manner and by the means described the middle one of the five punches makes a record upon the paper strip every time the train moves from a position of rest.

It will next be in order to describe the means for making a record of the entrance and exit of passengers and for advancing the paper strip after making each of such records, so as to bring a blank portion of the strip to the recording-point.

As seen in Fig. 3, the shaft H, near its lower end, is fluted, so as to form a sort of gear $A^4$, which meshes with a gear-toothed segment $B^4$, Fig. 17, which is mounted upon a pivot $C^4$ upon the upper side of a post or bracket $D^{41}$, secured at its lower end to the bottom of the register-box $B'$, Fig. 3. Projecting from the upper side of the segment $B^4$ is a stud $D^4$, which stands between the short arms of a pair of bell-cranks $E^4$ $F^4$, also mounted upon the pivot $C^4$. The outer end of the long arm of the bell-crank $E^4$ is pivoted in the end of a horizontal rod $G^4$, extending to the right through and having its support in the supporting-brackets $T^2$ of the frame $S^2$, Figs. 3 and 4, while the outer end of the long arm of the bell-crank $F^4$ is pivoted in the end of a rod $H^4$, corresponding to the rod $G^4$. It results from this construction and arrangement that when the shaft H is turned in the direction of the arrow, Fig. 17, by swinging inward the lower pair of gates F the rod $H^4$ will be drawn to the left by the bell-crank $F^4$, while the rod $G^4$ will remain at rest, while when the shaft H is turned in the opposite direction by swinging the lower pair of gates outward the rod $G^4$ will be drawn to the left by the bell-crank $E^4$, and the rod $H^4$ will remain at rest.

Coiled springs $I^4$, surrounding the rods and confined between pins passed through them and the left-hand bracket $T^2$, Fig. 3, press the rods to the right and serve to normally hold the short arms of the bell-cranks $E^4$ $F^4$ in contact with the pin $D^4$. The two rods $G^4$ $H^4$ constitute the two outer ones of the series of five rods shown in Fig. 8, of which the rod $K^3$, heretofore described, is the middle one. Like the rod $K^3$, the rods $G^4$ and $H^4$ are provided with spring-pressed dogs $S^3$, Fig. 3, coöperating with bell-cranks $U^3$, connected to the lower ends of the two outside punches $B^3$, with the result that when the lower pair of gates is swung inward the punch actuated by the rod $H^4$ will make a record upon the paper strip near one edge of the latter, while each time said gates are swung outward the punch actuated by the rod $G^4$ will make a record upon said strip near its opposite edge.

The lower end of the shaft J is fluted in the same manner as the shaft H to form a gear $J^4$, which meshes with a gear-toothed segment K⁴, Figs. 3 and 16, mounted upon a pivot L⁴ upon the upper side of a post or bracket M⁴, Fig. 3, and provided with an upwardly-projecting stud N⁴, which stands between the short arms of a pair of bell-cranks O⁴ P⁴, whose long arms are respectively pivoted at their outer ends in the ends of horizontal rods Q⁴ R⁴, extending to the left on opposite sides of the oil-pump, Fig. 4, and bent in at the left of the same, so as to fit between the rods G⁴ H⁴, as seen in Fig. 8, and embrace between them the rod K³, said rods Q⁴ R⁴ extending at their left-hand ends through the supporting-brackets T² of the frame S² and having their support therein. These two rods are provided with spring-pressed dogs S³, corresponding to those of the other rods and coöperating with the bell-cranks U³ of the two punches B³, immediately adjacent the middle punch B³, actuated by the rod K³. It results from this construction and arrangement that whenever the shaft J is turned in the direction of the arrow in Fig. 16 by swinging the upper pair of gates inward the rod R⁴ will be forced to the left by the bell-crank P⁴, and the punch actuated by such rod caused to make a record upon the paper strip at one side of the middle line thereof, while when the shaft J is turned in the opposite direction by swinging the upper pair of gates outward the rod Q⁴ will be forced to the left and the punch actuated by such rod be caused to make a record upon the paper strip at the opposite side of the middle line thereof. Coiled springs S⁴, surrounding the rods Q⁴ R⁴ and confined between nuts or collars T⁴ thereon and ears U⁴ upon the oil-pump casting, through which ears the rods pass, Fig. 3, press the rods toward the right and serve to normally hold the short arms of the bell-cranks O⁴ P⁴ in contact with the pin N⁴.

From the foregoing description it will be understood that at the entrance of each passenger, and consequent swinging inward of both pairs of gates, two records will be made upon the paper strip at one side of the middle line thereof, (the upper side in Fig. 4,) one of which records will be made by the punch actuated by the rod R⁴ at the swinging inward of the upper pair of gates, while at the exit of each passenger two records will be made at the opposite side of the middle line of the paper strip, (the lower side in Fig. 4,) one by the punch actuated by the rod Q⁴ at the swinging outward of the upper pair of gates and the other by the punch actuated by the rod G⁴ at the swinging outward of the lower pair of gates.

The records made by the several punches may be distinguished from each other merely by their positions upon the paper strip, or the punches may be such as to effect different forms of records upon the paper strip. Thus, for instance, as shown in Figs. 4 and 26, the two punches actuated by the swinging inward of the respective pairs of gates may be such as to make a record upon the strip in the shape of the letter "I," thus indicating the record of an ingoing passenger, while the punches actuated by the swinging outward of the respective pairs of gates may make a record representing the letter "O," to indicate the record of an outgoing passenger, while the punch actuated at the starting of the train may be such as to make any arbitrary form of record desired.

Inasmuch as quite a number of passengers may frequently enter or leave the car at a given station while the train remains at rest, it is necessary that means be provided for advancing the record-strip after the entrance or exit of each passenger, so that a blank portion of the strip may be brought to the recording-point for each record, and to this end the following means are provided: As seen in Fig. 8, there is fast upon the outer end of the shaft N², which carries the upper feed-roller O², a ratchet V⁴, also shown in Fig. 18, with which ratchet coöperates a pawl W⁴, pivoted upon an arm X⁴, hung at its upper end upon the shaft N² and connected at its lower end by a link Y⁴ to the lower arm of a bell-crank lever Z⁴, which is pivoted to the side of the register-box B' at A⁵, Figs. 3 and 7, and whose upper arm has pivoted to it the lower end of a vertical rod B⁵, extending upward through the top of the register-box and terminating at its upper end immediately beneath the front edge of the second step B, leading up to the platform D. The upper end of the rod B⁵ is hidden in Fig. 9 by a rod marked B⁷ and in Fig. 10 by a rod marked B⁸. Its upper end is pivoted between ears upon the under side of the step B, just as the upper end of the rod B⁸ is shown pivoted to ears upon the under side of the step C in Fig. 9. As seen in Figs. 9 and 11, the steps B and C are hinged at their rear edges so that their forward edges are free to rise and fall, and they are yieldingly held in their upper normal positions by strong coiled springs C⁵, Figs. 10 and 11, interposed between their under sides and brackets D⁵, secured to the rear wall of the step beneath. An adjustable stop-screw E⁵, mounted in each bracket D⁵ and coöperating with a projecting casting F⁵, secured to the under side of the hinged step above, may be employed to limit the downward movement of the front edge of the step. At each entrance or exit of a passenger the depression of the front edge of the step B and its return to normal position by the spring C⁵ will cause the pawl W⁴ to turn the ratchet V⁴ and shaft N² and feed-rollers O² V² and advance the paper strip.

The depression of the front edges of the steps B and C at the entrance and exit of passengers also serves other purposes, which will be hereinafter explained.

For the purpose of necessitating the closing of the gates after the entrance or exit of each separate passenger and preventing the gates being held open while a number of passengers enter or leave the car, and to thus insure the making of a record upon the paper strip at the entrance and exit of each passenger, there are provided locking devices intermediate the two pairs of gates by means of which, when the gates of the lower pair are swung open to permit a passenger to go through them, the gates of the upper pair become automatically locked in closed position and remain locked until the lower gates are closed, so that when a passenger has opened the lower gates and passed beyond them he cannot open the upper gates and ascend to the platform of the car until the lower gates are closed. Likewise, when the gates of the upper pair are swung open at the exit of a passenger the lower pair of gates is locked and cannot be opened until the upper gates are closed.

In addition to the locking devices intermediate the two pairs of gates, there are locking devices controlled by the hinged steps, which normally lock the upper gates from inward movement and the lower gates from outward movement, but automatically release them as the entering or outgoing passenger steps upon and depresses the step in front of them. These locking devices are as follows: Mounted in bearings $G^5$, formed upon the inner side of the left-hand end plate of the register-box $B'$, Fig. 4, is a rock-shaft $H^5$, while mounted in bearings $I^5$, formed upon the inner side of the opposite end of the register-box, is a rock-shaft $J^5$. Strong coiled springs $J'$, connected at one end to arms $J^{11}$, fast upon the respective shafts, and at their other ends attached to the bottom of the register-box $B'$, Fig. 4, serve to yieldingly hold the shafts in and return them to normal position. Fast upon the rock-shaft $J^5$ about midway of its length is a sector plate or casting $K^5$, Figs. 3, 4, and 14, whose periphery is provided with a recess or slot $L^5$. This sector $K^5$ fits at its outer edge in a vertical passage-way between two horizontal locking arms or disks $M^5 N^5$, fast upon the vertical shaft J, in horizontal planes, one above the other, and in this instance forming part of the same integral casting fast upon such shaft. In the normal position of the parts, with the sector $K^5$ fitting in the vertical passage-way between the arms $M^5 N^5$, the recess $L^5$ in the sector stands in the same horizontal plane as the lower locking-arm $N^5$, Fig. 3, so that in such position of the parts the shaft J is free to be turned in the direction of the arrow, but is locked from movement in the opposite direction. It results from this that in the normal position of the parts the upper gates are free to be swung outward, but cannot be swung inward. When the shaft $J^5$ is rocked and the sector $K^5$ thrown upward until the recess $L^5$ is brought into the same horizontal plane as the locking-arm $M^5$, the shaft J will be locked from movement in the direction of the arrow, but free to be moved in the opposite direction, so that the gate may be swung inward, but cannot be swung outward, while when the shaft is so moved as to carry the sector to a position in which its slot $L^5$ does not register with either of the locking-arms the shaft J cannot turn in either direction and the gates will consequently be locked in both directions. It will also be seen that when the shaft J is turned in either direction, in either the upper or lower position of the sector $K^5$ the arm $M^5$ or $N^5$, which enters the recess in the sector, will lock the latter and the shaft $J^5$ from movement until the shaft J is returned to normal position.

The rock-shaft $H^5$ at the opposite end of the register has fast upon it a sector $O^5$, Figs. 3 and 4, similar to the sector $K^5$ above described, provided with a recess $P^5$ and coöperating with locking-arms $Q^5 R^5$, fast upon the shaft H, in the same manner that the sector $K^5$ coöperates with the locking-arms upon the shaft J. This sector and the locking-arms upon the shaft H normally stand in such relative position that the lower gates are free to be swung inward, but are locked from swinging outward. Now the shaft J has fast upon it, toward the upper part of the register-box, an arm $S^5$, Figs. 3, 4, 5, and 6, whose outer end is connected by a link $S^6$ to one arm of a bell-crank $T^5$, fulcrumed on a support $U^5$, extending downward from the top plate of the register-box, and whose other arm is pivoted to the right-hand end of a rod $V^5$, extending to the left longitudinally of the register-box and connected at its extreme left-hand end by a slot-and-pin connection to an arm $W^5$, fast upon the end of the rock-shaft $H^5$. The shaft H has fast upon it an arm $X^5$, Figs. 3 and 4, similar to the arm $S^5$ upon the shaft J and connected by a link $Y^5$ to one arm of a bell-crank $Z^5$, fulcrumed on a support $A^6$, extending downward from the under side of the top plate of the register-box $B'$, and whose other arm is pivoted to the left-hand end of a rod $B^6$, extending to the left longitudinally of the register-box and connected at its right-hand end by a slot-and-pin connection to an arm $C^6$, fast upon the end of the rock-shaft $J^5$.

From the foregoing description it will be understood that when the rock-shaft H is turned in either direction it will draw the rod $B^6$ to the left and rock the shaft $J^5$ and locking-sector $K^5$ at the right-hand end of the register, while when the rock-shaft J is turned in either direction it will draw the rod $V^5$ to the right and rock the shaft $H^5$ and locking-sector $O^5$ at the left-hand end of the register. Now when the rock-shaft H is turned in the direction of the arrow in Fig. 3 at the opening inward of the lower pair of gates the locking-arm $Q^5$ on said shaft will enter the recess in the locking-sector $O^5$ and lock the latter and the rock-shaft $H^5$ from movement until the shaft H is returned to normal position by the closing of the gates. Inasmuch as the rock-shaft J cannot be turned in either direction without drawing the rod $V^5$ to the right and rocking the shaft $H^5$ and locking-sector $O^5$, it follows that so long as the gates of the lower pair remain open and the sector $O^5$ and rock-shaft H⁵ locked thereby in normal position, in the manner above explained, the rock-shaft J cannot be turned in either direction, and consequently the upper pair of gates will be locked in closed position so long as the lower gates remain in open or partly open position. On the other hand, when the rock-shaft J is turned in the direction of the arrow in Fig. 3 at the opening outward of the upper pair of gates its locking-arm N⁵ will enter the recess in the locking-sector K⁵ and hold the latter and the rock-shaft J⁵ from movement, and consequently lock the rock-shaft H and lower gates from movement in either direction until the rock-shaft J is returned to normal position by the closing of the upper gates.

As before explained, the lower gates are normally locked from outward movement by the coöperation of the locking-arm R⁵ on the rock-shaft H with the locking-sector O⁵, while the upper gates are normally locked from inward movement by the coöperation of the locking-arm M⁵ on the rock-shaft J with the locking-sector K⁵. It will now be understood that when an entering passenger swings the lower gates inward (he cannot pull them outward) he thereby locks the upper gates from opening in either direction, so that it is not possible for him to reach forward and pull the upper gates open while holding, or allowing some one behind him to hold, the lower gates open, and that therefore before he can pass through the upper gates the lower gates must be closed. So when an outgoing passenger swings the upper gates outward (he cannot pull them inward) he thereby locks the lower gates from opening in either direction and cannot pass through the lower gates until the upper gates are closed behind him.

Inasmuch as the upper gates are normally locked from inward movement, it is necessary that they be unlocked after the entering passenger has passed through the lower gates and the latter have closed behind him, and inasmuch as the lower gates are normally locked from outward movement it is necessary that they should be unlocked for the outgoing passenger after he has passed through the upper gates and they have been closed behind him. This unlocking of the upper gates for the entering passenger is automatically effected by the depression of the hinged upper step C as the passenger steps upon it, while the unlocking of the lower gates for the outgoing passenger is likewise automatically effected by the depression of the hinged step B as such passenger steps upon it. For this purpose the rod B⁸, heretofore referred to, whose upper end is pivoted to the under side of the step C near its forward edge, Fig. 9, is pivoted at its lower end to the upper arm of a bell-crank D⁶, Figs. 3 and 4, fulcrumed upon the side of the register-box B', and whose lower arm is pivoted to the left-hand end of a rod E⁶, extending to the right, and connected at its extreme right-hand end by a slot-and-pin connection to the lower end of an arm F⁶, fast upon the end of the rock-shaft J⁵, Fig. 5. Owing to this connection of the hinged step C with the rock-shaft J⁵, which carries the locking-sector K⁵, the latter will be thrown upward by the depression of the step C so as to bring its recess L⁵ opposite the locking-arm N⁵ and thus release the upper gates and permit them to be swung inward. The bell-crank Z⁴, which, as before explained, has pivoted to it the lower end of the rod B⁵, whose upper end is connected to the hinged step B, is provided with a third arm G⁶, extending upwardly and to the left of its fulcrum, Figs. 3, 4, and 7, and the end of this arm is connected by a strong coiled spring H⁶ to an arm I⁶, fast upon the end of the rock-shaft H⁵, Fig. 4, and corresponding to the arm W⁵, fast upon the opposite end of said shaft and shown in Fig. 3. Owing to this connection of the step B with the rock-shaft H⁵, whenever said step is depressed and the bell-crank Z⁴ rocked the lower end of the arm I⁶ will be drawn to the right and the shaft H⁵ rocked far enough to carry the locking-sector O⁵ into position with its recess P⁵ opposite the locking-arm R⁵ on the shaft H to release the lower gates and permit them to be swung outward by the outgoing passenger.

When the upper gates are unlocked in the manner above described by the weight of the entering passenger upon the upper step C and are swung inward by him, the locking-arm M⁵ on the rock-shaft J will enter the recess in the locking-sector K⁵ and serve to lock the latter and the rock-shaft J⁵, and consequently the rock-shaft H and lower gates, in the same manner as when the upper gates are swung outward, and as has been heretofore explained, while then the lower gates are unlocked by the weight of the outgoing passenger upon the step B and are swung outward by him the arm R⁵ on the rock-shaft H will enter the recess in the locking-sector O⁵ and lock the latter and the rock-shaft H⁵, and consequently the rock-shaft J and upper pair of gates, so that when the upper gates are swung inward the lower gates are locked from movement in either direction, and when the lower gates are swung outward the upper gates are locked from movement in either direction.

In addition to the locking and unlocking of the two pairs of gates in the manner above described, when the rock-shaft H is turned in either direction the rod B⁶ will rock the shaft J⁵ at the opposite end of the register and throw the sector K⁵ upward to such position that its recess L⁵ will not register with either of the locking-arms upon the shaft J, so that said shaft and the upper pair of gates will in this manner be locked from movement in either direction until the rock-shaft H is returned to normal position by the closing of the lower gates, and when the rock-shaft J is turned in either direction the rod V will rock the shaft H⁵ at the opposite end of the register and swing the sector O⁵ upward into such position that its recess will not register with either of the locking-arms upon the rock-shaft H, so that the latter shaft and the lower pair of gates will be locked from movement in either direction until the rock-shaft J and upper pair of gates are returned to normal position. When either pair of gates is opened in either direction, therefore, the gates of the other pair are doubly locked in normal position.

For the purpose of constantly locking the upper gates in closed position so long as the train is in motion and preventing them being opened in either direction the following means are provided: The piston-rod $K^3$, operated by the oil-pump and heretofore described, has secured upon it a laterally-projecting arm $J^6$, Figs. 4 and 6, whose outer end is shaped to fit and travel in a groove or guideway formed upon the inner side of the upper end of a bracket-plate $K^6$, secured at its lower end to the bottom plate of the register-box $B'$ and projecting vertically therefrom, Figs. 3, 4, and 6. The arm $J^6$ has fastened to it the left-hand end of a rod $L^6$, whose right-hand end is pivoted to an arm $M^6$, fast upon the rock-shaft $J^5$, with the result that when the piston-rod $K^3$ is forced to the left at the starting of the train, in the manner heretofore described, the shaft $J^5$ will be rocked and its locking-sector $K^5$ swung upward into position to carry its recess $L^5$ beyond the horizontal plane of the locking-arm $N^5$, and also beyond the plane of the locking-arm $M^5$, to thereby lock the shaft J from movement in either direction, and inasmuch as the piston-rod $K^3$ is held in its extreme forward position by the action of the oil-pump so long as the train remains in motion it follows that the upper gates will remain locked in closed position while the movement of the train continues.

For the purpose of locking the lower gates in open position after a passenger has passed through them and while he remains standing upon the second step B there is provided a ratchet-toothed sector $N^6$, fast upon the shaft P beneath the lower step A, Fig. 9, with which sector coöperates a bell-crank locking-dog $O^6$, fulcrumed in a support upon the under side of the step A and having the rear end of its horizontal arm pivoted to the lower end of the rod $B^7$, heretofore referred to, the upper end of which rod passes through a guide-opening in a bracket $P^6$, secured to the rear wall of the step A and terminating at its upper end immediately beneath the hinged step B. The rod $B^7$ has fast upon its upper end a nut or collar $Q^6$, between which and the bracket $P^6$ is confined a coiled spring $R^6$, which yieldingly holds the rod in its upper position with the nut or collar $Q^6$ bearing against the under side of the step B. When the lower gates F are swung inward, the shaft P and ratchet $N^6$ will be turned rearward in the direction indicated by the arrow in Fig. 9, and when the passenger steps upon and depresses the step B the locking-dog $O^6$ will engage with the toothed sector and prevent return movement of the latter and shaft P, and consequently lock the gates in open position so long as the step B remains depressed by the weight of the passenger.

Inasmuch as the upper gates are locked from opening in either direction so long as the lower gates remain open, it follows that any passenger standing upon the third step C cannot open and pass through the upper gates G while a passenger stands behind him upon the step B. The locking device just described therefore prevents two passengers going through the lower gates without closing said gates between them and standing one behind the other upon the second and third steps, while the first opens the upper gates to permit them to pass through the latter. When the step B is depressed by an outgoing passenger, the dog $O^6$ does not engage the sector $N^6$, so the gates are left free to be swung open.

A similar locking arrangement is provided for locking the upper gates in outward position so long as the outgoing passenger remains standing upon the step C, the latter having secured to its under side a locking-plate $S^6$, which coöperates with a ratchet-toothed sector $T^6$, fast upon the shaft $A'$. As the upper gates are swung outward by the outgoing passenger the shaft $A'$ and sector $T^6$ will be turned in the direction of the arrow, and as the passenger steps down upon the step C and depresses the latter the locking-plate $S^6$ will engage the sector and prevent return movement of the latter and shaft $A'$, so that the gates G will be held in open position so long as the passenger remains upon the step C.

Inasmuch as the lower gates F are locked in closed position so long as the upper gates G remain open, it follows that the locking devices just described prevent two outgoing passengers passing through the upper gates without closing the gates between them and standing upon the second and third steps B and C, while the first opens the lower gates F to permit them to pass through.

For the purpose of narrowing the tread of the steps B C to prevent two passengers crowding one behind the other and standing upon the same step there are secured at the opposite sides of said steps the blocks $U^6$, Figs. 2 and 9, whose inner sides incline inward toward the middle line of the steps, from their upper to their lower edges, leaving only sufficient width of standing-space upon each step to permit one person to conveniently stand thereon.

For the purpose of latching the lower gates in open position when they are opened to permit the entrance of a passenger, and thereby obviate the necessity of the passenger holding them open, one of the gates F may be provided upon its inner edge with a projection $V^6$, adapted to coöperate with a spring-catch $W^6$ upon the forward edge of the upper step C, near one end of the latter, in such manner that when the gates F are swung inward to full-open position the projection V⁶ will be engaged by the latch and the gates be held in open position. As the passenger steps upon and depresses the upper step C the latch W⁶ will be disengaged from the projection V⁶ on the gate and the resetting-springs for the latter be permitted to close them.

Having now given an explanation of the mechanical construction and mode of operation of my registering or recording apparatus, I will next explain the manner in which the passenger mileage or the tickets, passes, and cash fares which the conductor must account for at the end of any given trip may be ascertained from the record made upon the paper record-strip during such trip.

For the purpose of simplifying the explanation as much as possible I will assume that there is but one passenger-car in the train, that the number of passengers carried during the trip is quite small, and that the only members of the train-crew who enter and leave the passenger-car are a conductor and brakeman.

In Fig. 26 of the drawings there is illustrated a section of the record-strip containing the records made during a trip from station A to station G under the conditions above assumed, it being understood that the portion of the strip shown in the lower half of the view has been severed from the right-hand end of the portion shown in the upper half of the view in order to accommodate the length of the strip to the width of the drawings. The capital letters along the upper edge of the strip in Fig. 26 opposite the records upon the strip indicate the different stations for the purpose of this explanation; but it will be understood that there are no letters or numbers upon the strip itself for that purpose, and that the stations at which the records upon the strip are made are ascertained, upon inspecting the strip, by the distance between the station punch or mark indicating the starting of the train and the first succeeding record upon the strip made by a person getting on or off the train. As seen in Fig. 26, there are opposite the starting-station A eleven records "in," indicating that eleven persons have boarded the car at that point, and three records "out," while the punch at $x$ indicates the starting of the train. As the record opposite station A shows eleven "in" and three "out," it follows that there were eight persons aboard the car when the train left that station, of whom two were the conductor and brakeman. The conductor is therefore to be charged with six passengers from station A to station B. At station B there are five records "out" and three "in," indicating that two more persons got off the train than got on, so that from station B to station C the conductor will be charged with four passengers. At station C there are two records "out" and two "in," so that upon leaving station C there were the same number of persons aboard the car as when arriving at that station, and from station C to station D the conductor will therefore be charged with four passengers. At station D there are three records "out" and five "in," so that two passengers are added to the number in the car, and the conductor will be charged with six passengers from station D to station E. At station E there is one more record "out" than "in," so that the number of passengers was reduced by one, and the conductor will therefore be charged with five passengers between stations E and F. At station F there are two more records "out" than "in," so that the number of passengers was reduced by two, and from station F to the destination-station G the conductor will therefore be charged with three passengers. At station G there are five records "out," made by the exit of the three passengers and the conductor and brakeman.

From the above explanation it will be seen that the number of passengers carried between the several stations may be readily ascertained from an inspection of the record-strip, and the conductor be charged with the corresponding passenger mileage and be obliged to settle for it with tickets, passes, and cash fares.

It will also be understood that the records made by the conductor and brakeman in getting on and off the car at the various stations do not in any way confuse the record of passengers carried, and it is wholly immaterial how many times they may leave and enter the car at the various stations along the line.

It will also be understood that while it is not possible to ascertain from the record-strip the exact station at which each individual passenger left the car it is not at all essential that this be done, since the record of the gross number of passengers carried between the several stations is sufficient for the purpose of ascertaining the transportation to be accounted for by the conductor.

The record made upon the strip at the starting-station shows the number of passengers aboard the car when the train left that station. The difference between the records "in" and records "out" at each succeeding station gives the number of passengers to be added to or subtracted from the number who were in the car when it started, so that the actual number carried between the several stations may be readily ascertained with absolute accuracy, regardless of the number of times the train-crew enter and leave the car, and also regardless of the number of other persons who may enter and leave the car at the different stations, as in the case of friends of the passengers entering with them and leaving before the train starts, as is frequently the case. The record automatically made upon the record-strip is therefore entirely beyond the control of the conductor and cannot be tampered with or falsified by any manipulation on his part.

As illustrating the manner in which the records shown upon the strip in Fig. 26 were, or may have been, made it may be explained that a record such as that opposite station A would be made if the brakeman ascended the steps to the platform of the car and unlocked the door and then descended them, and if eight persons then entered the car and two of them came out before the train started and the conductor and brakeman then boarded the car; or the same record would be made if, after the brakeman had unlocked the door, as described, he and the conductor and six passengers boarded the car, and he and the conductor then got off and on again before the train started. The record opposite the station B would be effected, for instance, if the conductor and brakeman and three passengers left the car and the conductor and brakeman and one passenger then boarded it, or if five passengers got off and three got on without the conductor or brakeman leaving the car. A record of five "outs" and three "ins" would likewise be made, though not in exactly the same position as shown opposite station B in the drawings, if but two passengers left the car with the conductor and brakeman, and the brakeman then got on and off the car for some purpose, and then got on the car again, with the conductor, before the train started. The record opposite station C would be made if two passengers got off and two got on, without the conductor and brakeman leaving the car, or the same record would be effected by the conductor and brakeman getting off and then getting on again without any passengers entering or leaving the car, and so on with the records at all the stations.

The method above explained is perhaps the simplest one for making up the account against the conductor from the records upon the paper strip, but there are other methods which, while perhaps somewhat more difficult to explain, may be found preferable in actual practice. Among such other methods is the following: The accounting clerk will take the record-strip containing the record of the trip and will cancel at the starting-station a number of "in" records corresponding to the number of the train-crew, and will cancel at the destination-station the same number of "out" records. He will then assort the tickets (including any passes) turned in by the conductor with the report of his trip, and at each station he will cancel a number of "in" records corresponding to the number of tickets reading from such station, and at each station he will likewise cancel a number of "out" records corresponding to the number of tickets reading to such station. This will serve to cancel the "in" and "out" records made by passengers who had tickets (or passes). Then at each station the clerk will cancel as many uncanceled "in" and "out" records as correspond or offset each other— that is to say, if at any given station there are five "in" records and three "out" records he will cancel the three "out" records and the same number of "in" records, leaving uncanceled two "in" records. If at another station there are two "in" records and four "out" records, he will cancel the two "in" records and two of the "out" records, and so on, leaving uncanceled at each station only the excess of "in" or "out" records at such station. This canceling of corresponding or offsetting records will serve to eliminate from the record-strip all records made by any persons other than actual passengers, such as those made by the train-crew getting off and on the train at the various stations, by persons getting aboard the train to bid their friends "good-bye" or assist them with their hand-baggage, and so on. After all the canceling above described has been done there will be left upon the record-strip uncanceled the "in" and "out" records of only those passengers who have paid cash fares. The "in" records remaining uncanceled at the starting-station will of course represent the number of passengers from that station who paid cash fares, and the conductor will be charged with cash fares for that number of passengers from the first to the second station. At the second station if there are more "in" records than "out" records remaining uncanceled it will show that at that station that many cash-fare passengers were added to the number already on the train, and from the second to the third station, therefore, the conductor will be charged with cash fares for that number of passengers, and also with cash fares for the number upon the train when it arrived at such station. On the other hand, if the uncanceled "out" records at the second station exceeded the "in" records the number of cash fares charged the conductor between the second and third stations will be the number charged between the first and second stations less than the number represented by such excess of "out" records at the second station. If the train left the first station with three cash-fare passengers and there were two more uncanceled "in" records than "out" records at the second station, the conductor will be charged with five cash fares between the second and third stations. If at the third station there are three more uncanceled "out" records than "in" records, he will be charged with two cash fares between the third and fourth stations, and so on.

It will of course be understood that the records upon the record-strip will not necessarily show where each individual cash-fare passenger left the train, but it will also be understood that it is not at all essential to know this in order to ascertain the gross amount of cash fares which must be accounted for by the conductor.

While my invention has been more especially designed for use upon railway passenger-trains, it will nevertheless be understood that its utility is not restricted to such use and that many features of the invention may be advantageously employed in other relations.

It will also be understood that while I have illustrated and described two pairs of gates at the upper and lower ends of the steps, respectively, single gates may be employed instead of such pairs.

For the purpose of closing other entrances to the car than those provided with gates and registers the platform at each end of the car may be partially surrounded by a heavy wire-netting vestibule, as shown in Fig. 1. As there illustrated, this netting extends across the rear edge of the platform and also across the side edge thereof opposite the steps provided with the gates. At its middle, opposite the door of the car, it is provided with two swinging gates B⁹, which may be normally closed in line with each other and held together by a car-seal at D⁹. When the car is coupled to another car provided with a similar wire-netting vestibule, the seals D⁹, holding the gates B⁹ on the two cars in the position shown in Fig. 1, may be broken and the gates be swung outward toward each other and the two gates on each side of the passage-way be overlapped against one another and sealed in that position to form a closed passage-way from one car to the other.

Having thus fully described my invention, I claim—

1. The combination, with two gates closing a passage-way and requiring to be successively opened by persons passing therethrough, and adapted to be opened in one direction by persons passing in such direction and in the opposite direction by persons passing in the latter direction, of a recording mechanism actuated by both gates and operating to make a double record when the gates are successively opened by a person passing in one direction, and to make another different double record when opened by a person passing in the opposite direction.

2. The combination of two gates controlling a passage-way and requiring to be successively opened by persons passing therethrough, of a locking mechanism intermediate the two gates by which the opening of either gate locks the other and prevents it being opened until the first-mentioned gate is closed, and a recording mechanism actuated by one or both of said gates to make a record of the number of persons passing through them.

3. The combination of two gates controlling a passage-way and requiring to be successively opened by persons passing through the same, and normally free to be opened toward each other, and a locking mechanism intermediate the two gates by which the opening of either gate toward the other serves to lock such other from opening in either direction.

4. The combination of two gates controlling a passage-way and requiring to be successively opened by persons passing through the same, said gates being normally free to be opened toward each other but locked from opening in the opposite direction, and means intermediate the two gates operated automatically by the passage of a person between the gates for unlocking the gate in front of such person and permitting it to be opened outward from him.

5. The combination of two gates controlling a passage-way and requiring to be successively opened by persons passing through the same, said gates being normally free to be opened toward each other but locked from opening in the opposite direction, and means intermediate the two gates operated automatically by the passage of a person between the gates for reversing the action of the locking devices to permit the gate in front of the person to be opened outward but not inward.

6. The combination of two gates controlling a passage-way and requiring to be successively opened by persons passing through them, said gates being normally free to be opened toward each other but locked from opening in the opposite direction, means intermediate the two gates operated automatically by a person passing between the gates to release the gate in front of him and permit it to be opened outward, and locking mechanism intermediate the two gates by which the opening of either gate in either direction locks the other gate in closed position.

7. The combination of two pairs of gates controlling a passage-way and requiring to be be successively opened by a person passing through them, the gates of each pair being geared together so that the opening of one gate of the pair serves to open the other gate of such pair, and a locking mechanism intermediate the two pairs of gates by which the opening of either pair serves to lock the other pair in closed position.

8. The combination, with the steps of a railway-car or other vehicle, of two gates, one at the lower end of said steps and the other at the upper end, and adapted to be opened in one direction by a person entering the vehicle and in the opposite direction by a person leaving the vehicle, locking mechanism normally locking the gates from opening inward toward each other, and means coöperating with the steps intermediate the two gates and automatically operated by the weight of a person upon such steps to release the gate in front of such person as he is ascending or descending the steps, and permitting it to be opened outward before him.

9. The combination, with the steps of a railway-car or other vehicle, of two gates, one located at the upper and the other at the lower end of said steps, and adapted to be successively opened in one direction by a person entering the vehicle and in the opposite direction by a person leaving the vehicle, and locking mechanism intermediate the two gates by which the opening of either gate serves to lock the other gate in closed position.

10. The combination, with the steps of a railway-car or other vehicle, of two gates located respectively at the upper and lower ends of said steps and adapted to be opened in one direction by ingoing persons and in the opposite direction by outgoing persons, locking mechanism normally locking such gates from opening toward each other, means coöperating with the steps intermediate the two gates and automatically actuated by the weight of a person upon such steps to release the gate in front of him and permit it to be opened outward before him, and locking mechanism intermediate the two gates by which the opening of either gate serves to lock the other in closed position.

11. The combination, with a railway-car or other vehicle, of a gate controlling the entrance thereto and adapted to be opened in opposite directions by ingoing and outgoing persons, a record-strip advanced by the movement of the vehicle, and one set of recording devices actuated by said gate to make one record upon said strip when the gate is opened by an ingoing person and another set of recording devices actuated by said gate to make another record when it is opened by an outgoing person.

12. The combination, with a railway-car or other vehicle, of two gates controlling the entrance to the car and requiring to be successively opened in one direction by ingoing persons and in the opposite direction by outgoing persons, a record-strip advanced by the movement of the vehicle, and recording devices actuated by said gates to make a double record upon said strip of all ingoing persons and another double record of all outgoing persons.

13. The combination, with a railway-car or other vehicle, of a gate adapted to be opened in opposite directions by ingoing and outgoing persons, a record-strip advanced by the movement of the vehicle, two sets of recording devices independently actuated by said gate when the latter is opened in opposite directions for making separate records upon said strip of all ingoing and all outgoing persons, and means automatically actuated by the entrance and exit of persons to advance the record-strip independently of its advancement by the movement of the vehicle.

14. The combination, with the steps of a railway-car or other vehicle, one of which is depressible by the weight of a person stepping upon it, of a gate controlling entrance to the car by way of such steps and adapted to be opened in opposite directions by ingoing and outgoing persons, a record-strip advanced by the movement of the vehicle, recording devices actuated by said gate to make separate records upon such strip of the ingoing and outgoing persons, and means actuated by the depression of the step to automatically advance the record-strip at the entrance or exit of each person independently of the advancement of said strip by the movement of the vehicle.

15. The combination, with the steps of a railway-car or other vehicle, of two gates located respectively at the top and bottom of said steps, and adapted to be successively opened in one direction by ingoing persons and in the opposite direction by outgoing persons, a record-strip advanced by the movement of the vehicle, recording devices actuated by said gates to make a double record upon said strip of all ingoing persons and another double record of all outgoing persons, and means automatically actuated by the weight of a person upon one of the steps intermediate the two gates to advance the record-strip independently of its movement by the movement of the vehicle.

16. The combination, with a railway-car or other vehicle, of a recording mechanism comprising a record-strip advanced by the movement of the vehicle, recording devices automatically actuated by persons entering and leaving the car, to make separate records of all going in and all going out, and a recording device actuated automatically by the starting of the vehicle to make a record thereof upon the record-strip.

17. The combination, with a railway-car or other vehicle, of a gate controlling the entrance thereto and adapted to be opened in one direction by ingoing persons and in the opposite direction by outgoing persons, a record-strip advanced by the movement of the vehicle, recording devices actuated by said gate to make a record upon said record-strip of all ingoing persons and a separate record of all outgoing persons, and an additional recording device actuated by the starting of the vehicle, to make a record thereof upon said strip.

18. The combination, with a railway-car or other vehicle, of a recording mechanism comprising a record-strip advanced by the movement of the vehicle, recording devices automatically actuated by the entrance and exit of persons, to make separate records of the ingoing and outgoing persons, an oil-pump driven by the movement of the vehicle, and a recording device actuated by said pump at the starting of the vehicle to make a record thereof upon the record-strip.

19. The combination, with the steps of the car or other vehicle, and the gates at the top and bottom thereof, of a locking device operated by the depression of the second step to lock the lower gate in open position, when opened inward, and prevent it being closed until the weight upon the step is removed, whereby when an ingoing person has passed the lower gate the latter cannot be closed while he remains upon the second step.

20. The combination, with the steps of the car or other vehicle, and the gates at the top and bottom thereof, of a locking device operated by the depression of the second step to lock the lower gate in open position, when opened inward, and prevent it being closed until the weight upon the step is removed, and locking mechanism intermediate the upper and lower gates by which the opening of the lower gate serves to lock the upper gate in closed position, whereby when an ingoing person has passed the lower gate the latter cannot be closed and the upper gate cannot be opened while such person remains upon the second step.

21. The combination, with the steps of the car or other vehicle, and the upper and lower gates, of a locking device operated by the depression of the third step to lock the upper gate in open position when opened outward by an outgoing person, and prevent closing of said gate while such person remains upon said step.

22. The combination, with the steps of the car, or other vehicle, and the upper and lower gates, of a locking device operated by the depression of the third step to lock the upper gate in open position when opened outward by an outgoing person, and locking mechanism intermediate the upper and lower gates by which the opening of the upper gate serves to lock the lower gate in closed position, whereby when an outgoing person has passed the upper gate the latter cannot be closed and the lower gate cannot be opened while such person remains upon said step.

23. The combination, with the steps A B C, the step B being hinged and depressible, of the vertical rock-shaft H, a gate carried thereby, the horizontal rock-shaft P geared to the shaft H, and locking mechanism intermediate the step B and shaft P for locking the gate in inward position when it is opened thereto and the step B depressed.

24. The combination, with the steps A B C, the step B being hinged and depressible, of the vertical rock-shaft H, a gate carried thereby, the horizontal rock-shaft P geared to the shaft H, the toothed sector $N^6$ fast upon the shaft P, the locking-dog $O^6$ coöperating with the sector, and the rod $B^7$ intermediate said dog and the step B for engaging the dog with the sector at the depression of the step B.

25. The combination, with the steps A B C, of which the step C is hinged and depressible, of the vertical rock-shaft J, a gate carried thereby, the shaft A' geared to the shaft J, and locking devices intermediate the shaft A' and step C for causing the depression of the latter, after the gate carried by the shaft J has been opened outward, to lock said gate in open position while the step C remains depressed.

26. The combination, with the steps of the car or other vehicle, of the rock-shafts J and H at the top and bottom thereof, the gates G and F carried by said shafts, and locking mechanism intermediate the shafts for causing the turning of one by the opening of its gate to lock the other in normal position.

27. The combination, with the steps of the car, of which the steps B and C are hinged and depressible, of the upper and lower gates carried by the vertical rock-shafts J and H, locking devices intermediate the rock-shaft H and step B normally locking the gate F from outward movement but released by depression of the step B, and locking devices intermediate the rock-shaft J and step C normally locking the gate G from inward movement but released by the depression of the step C.

28. The combination, with the steps of the car, of which the steps B and C are hinged and depressible, of the upper and lower gates carried by the vertical rock-shafts J and H, locking devices intermediate the rock-shaft H and step B normally locking the gate F from outward movement but operated by depression of the step B to release the gate from outward movement and lock it against inward movement, and locking devices intermediate the rock-shaft J and step C normally locking the gate J from inward movement but operated by depression of the step C to release the gate for such movement and lock it against outward movement.

29. The combination of the rock-shaft H, the locking-arms $Q^5 R^5$ fast thereon, and the sector $O^5$ provided with the recess $P^5$ and coöperating with the arms $Q^5 R^5$ to lock the shaft H from turning in one direction when the sector is in one position and from turning in the opposite direction when the sector is in another position.

30. The combination, with the hinged step B of the car, of the rock-shaft H carrying the gate F, the locking-arms $Q^5 R^5$ fast upon said shaft, the locking-sector $O^5$ coöperating with said locking-arms, and a connection between the step B and sector $O^5$ for causing depression of the step to shift the sector and reverse its locking coöperation with the arms $Q^5 R^5$.

31. The combination of the rock-shaft H, the locking-arms $Q^5 R^5$ fast thereon, the sector $O^5$ coöperating with the arms $Q^5 R^5$, the rock-shaft J, and a connection between said shaft J and the sector $O^5$ by which movement of the shaft J from normal position moves the sector $O^5$ to position to lock the shaft H in normal position.

32. The combination of the rock-shaft J, the locking-arms $M^5 N^5$ fast thereon, the sector $K^5$ coöperating with said arms, the rock-shaft H, and a connection between said shaft H and the sector $K^5$ by which movement of the shaft H from normal position moves the sector $K^5$ into position to lock the shaft J in normal position.

33. The combination of the shaft H, the locking-arms $Q^5 R^5$ fast thereon, the sector $O^5$ coöperating with said arms, the rock-shaft J, the locking-arms $M^5 N^5$ fast thereon, the sector $K^5$ coöperating with said arms, and connections between the shaft H and sector $K^5$ and between the shaft J and sector $O^5$ by which movement of the shaft H from normal position operates to lock the shaft J in normal position, and by which movement of the shaft J from normal position operates to lock the shaft H in normal position.

34. The combination of the rock-shaft H, the locking-arms $Q^5 R^5$ fast thereon, the rock-shaft $H^5$, the sector $O^5$ coöperating with said arms, the rock-shaft J, the arm $S^5$ fast thereon, the bell-crank $T^5$ connected to the arm $S^5$ by the link $S^6$, and the rod $V^5$ connecting the bell-crank $T^5$ with an arm $W^5$ fast upon the rock-shaft $H^5$.

35. The combination of the rock-shaft J, the locking-arms $M^5 N^5$ fast thereon, the rock-shaft $J^5$, the sector $K^5$ fast thereon and coöperating with the arms $M^5 N^5$, the rock-shaft H, the arm $X^5$ fast thereon, the bell-crank $Z^5$ connected to the arm $X^5$ by the link $Y^5$, and the rod $B^6$ connecting the bell-crank $Z^5$ with an arm $C^6$ upon the rock-shaft $J^5$.

36. The combination of the rock-shaft H, the locking-arms $Q^5 R^5$ fast thereon, the rock-shaft $H^5$, the sector $O^5$ fast thereon and coöperating with the arms $Q^5 R^5$, the rock-shaft J, the locking-arms $M^5 N^5$ fast thereon, the rock-shaft $J^5$, the sector $K^5$ fast thereon and coöperating with the arms $M^5 N^5$, the arm $S^5$ fast upon the rock-shaft J, the bell-crank $T^5$ connected by the link $S^6$ to the arm $S^5$, the rod $V^5$ connecting said bell-crank with an arm $W^5$ fast upon the rock-shaft $H^5$, the arm $X^5$ fast upon the rock-shaft H, the bell-crank $Z^5$ connected by a link $Y^5$ to the arm $X^5$, and the rod $B^6$ connecting said bell-crank with an arm $C^6$ fast upon the rock-shaft $J^5$.

37. In a recording apparatus for making a record of the number of persons passing a given point in opposite directions, the combination, with a record-strip and means for advancing the same, of a rock-shaft adapted to be turned in one direction by persons passing in one direction, and in the opposite direction by persons passing in the other direction, a recording device actuated by the rock-shaft when turned in one direction from normal position, to make a record upon said record-strip of persons passing in one direction, and a second recording device actuated by the rock-shaft when turned in the opposite direction from normal position, to make a record upon said strip of the number of persons passing in the other direction.

38. The combination, with a record-strip and means for advancing the same, of a gate controlling a passage and adapted to be swung in opposite directions, a rock-shaft turned in opposite directions by movements of the gate, and two independent recording devices operated by the rock-shaft and coöperating with the record-strip to effect records of the movement of the gate and shaft in opposite directions.

39. In a passenger register or recorder employing a record-strip advanced by the movement of the vehicle, the combination of a rock-shaft carrying a gate requiring to be opened in one direction by the entrance of a passenger and in the opposite direction by the exit of a passenger, a recording device actuated by the shaft when turned in one direction, to effect the record of an entering passenger, and a second recording device actuated by the shaft when turned in the opposite direction, to effect a record of an outgoing passenger.

40. The combination, with a record-strip and means for advancing the same, of the rock-shaft H, the segment $B^4$ geared to said shaft, the bell-cranks $E^4$ and $F^4$ coöperating with the projection $D^4$ upon the segment $B^4$, the rods $G^4 H^4$ operated by said bell-cranks, and the punches operated by said rods and coöperating with the record-strip.

41. The combination, with a record-strip and means for advancing the same, of the rock-shaft H, the segment $B^4$ geared to said shaft, the bell-cranks $E^4$ and $F^4$ coöperating with the projection $D^4$ upon the segment $B^4$, the rods $G^4 H^4$ operated by said bell-cranks, the punches $B^3$ coöperating with the record-strip, the bell-cranks $U^3$ connected to said punches, and the dogs $S^3$ carried by the rods $G^4 H^4$ and coöperating with the bell-cranks $U^3$.

42. The combination, with a record-strip and means for advancing the same, of the rock-shaft J, the segment $K^4$ geared thereto, the bell-cranks $O^4 P^4$ coöperating with a projection $N^4$ upon the segment $K^4$, the rods $Q^4 R^4$ operated by the bell-cranks, and the punches operated by said rods and coöperating with the record-strip.

43. The combination, with a record-strip and means for advancing the same, of the rock-shafts H and J, the segment $B^4$ geared to the shaft H, the bell-cranks $E^4$ and $F^4$ coöperating with a projection $D^4$ upon the segment $B^4$, the rods $G^4 H^4$ operated by said bell-cranks, the segment $K^4$ geared to the rock-shaft J, the bell-cranks $O^4 P^4$ coöperating with a projection $N^4$ upon the segment $K^4$, the rods $Q^4 R^4$ operated by said bell-cranks, and the punches operated by the respective rods $G^4 H^4 Q^4 R^4$ and coöperating with the record-strip.

44. The combination, with a record-strip and means for advancing the same, of the rock-shafts H and J, the segment $B^4$ geared to the shaft H, the bell-cranks $E^4$ and $F^4$ coöperating with a projection $D^4$ upon the segment $B^4$, the rods $G^4 H^4$ operated by said bell-cranks, the segment $K^4$ geared to the rock-shaft J, the bell-cranks $O^4 P^4$ coöperating with a projection $N^4$ upon the segment $K^4$, the rods $Q^4 R^4$ operated by said bell-cranks, the rotary oil-pump, the reciprocating piston advanced by the starting of the pump, the piston-rod $K^3$, and the punches operated by the respective rods $G^4 H^4 Q^4 R^4 K^3$ and coöperating with the record-strip.

45. The combination of the rock-shafts H and I, the shaft P geared thereto, the arms Q and R loose upon said shaft, the springs S and T coiled around said shaft and connected at one end to the shaft and at their opposite ends to the arms Q and R respectively, the arm V fast upon the shaft P and provided with the transverse pin W coöperating with the arms Q and R, and the stops X and Y also coöperating with said arms.

46. The combination, with a railway-car or other vehicle, and a gate controlling the entrance thereto, of a locking device for said gate automatically operated by the movement of the vehicle to lock the gate in closed position at the starting of the vehicle.

47. The combination, with a railway-car or other vehicle, and a gate controlling the entrance thereto, of a locking device for said gate automatically operated by the movement of the vehicle to lock the gate in closed position at the starting of the vehicle and maintain it locked in such position during the continued movement of the vehicle.

48. The combination, with a railway-car or other vehicle, and a gate controlling the entrance thereto, of an oil-pump operated by the movement of the vehicle, and a locking device actuated by such pump and coöperating with the gate to automatically lock the latter in closed position at the starting of the vehicle.

49. The combination, with a railway-car or other vehicle, and a gate controlling the entrance thereto, of an oil-pump operated by the movement of the vehicle, and a locking device actuated by such pump and coöperating with the gate to automatically lock the latter in closed position at the starting of the vehicle and maintain it locked in such position so long as the operation of the pump by the movement of the vehicle continues.

50. The combination, with a railway-car or other vehicle, and a gate controlling the entrance thereto, of a rock-shaft J turned from normal position by the opening of the gate, locking-arms $M^5$ $N^5$ fast thereon, a locking-sector $K^5$ coöperating with said arms, a rotary oil-pump operated by the movement of the vehicle, a reciprocating piston advanced by the action of the oil-pump at each starting of the vehicle and maintained in advanced position by the continued operation of the pump during the movement of the vehicle, and connections between such piston and the sector $K^5$ for causing the piston to move the sector at the starting of the vehicle into position to lock the rock-shaft J in normal position and maintain it so locked while the piston is held in advanced position by the continued operation of the oil-pump during the movement of the vehicle.

51. The combination, with a railway-car or other vehicle, of a recording mechanism comprising a record-strip advanced by the movement of the vehicle, a recording device automatically actuated by persons entering the car, to make a record thereof on the record-strip, and means automatically actuated by the entrance of each person to advance the record-strip independently of its advancement by the movement of the vehicle.

52. The combination, with a railway-car or other vehicle, of a recording mechanism comprising a record-strip advanced by the movement of the vehicle, recording devices automatically actuated by persons entering and leaving the car, to make separate records of all persons going in and of all persons going out, and means automatically actuated by the entrance or exit of each person for advancing the record-strip independently of its advancement by the movement of the vehicle.

53. The combination, with a railway-car or other vehicle, of a recording mechanism comprising a record-strip advanced by the movement of the vehicle, a recording device automatically actuated by persons entering the car, to make a record thereof on the record-strip, and a recording device actuated by the starting of the vehicle to make a record of such starting upon the record-strip.

54. The combination, with a railway-car or other vehicle, and a gate controlling the entrance thereto, of a recording mechanism comprising a record-strip advanced by the movement of the vehicle, a recording device automatically actuated by the opening of the gate, to make a record thereof upon the record-strip, and a recording device actuated by the starting of the vehicle to make a record of such starting upon the record-strip.

55. The combination, with a railway-car or other vehicle, of a recording mechanism comprising a record-strip advanced by the movement of the vehicle, a recording device automatically actuated by persons entering the vehicle, means automatically actuated by the entrance of each person to advance the record-strip independently of its advancement by the movement of the vehicle, and a recording device automatically actuated at the starting of the vehicle to make a record of such starting upon the record-strip.

56. The combination, with a railway-car or other vehicle, of a recording mechanism comprising a record-strip advanced by the movement of the vehicle, recording devices automatically actuated by persons entering and leaving the car to make separate records of all persons going in and of all going out, means automatically actuated by the entrance and exit of each passenger to advance the record-strip independently of its advancement by the movement of the vehicle, and a recording device automatically actuated at the starting of the vehicle to make a record of such starting upon the record-strip.

57. The combination, with the steps of the car, of which the step B is hinged and depressible, of the rock-shaft H and the lower gate carried thereby, locking devices coöperating with the shaft to normally lock the gate from outward movement, and means intermediate said device and the hinged step B for releasing the gate upon the depression of said step.

58. The combination, with the steps of the car, of which the step B is hinged and depressible, of the rock-shaft H and the lower gate carried thereby, locking devices coöperating with the shaft to lock the gate from outward movement but permitting inward movement thereof, and means intermediate said locking devices and the hinged step B for reversing the action of the locking devices upon the depression of said step, to lock the gate from inward movement and permit it to be opened outward.

59. The combination of the rock-shaft H, the locking-arms $Q^5$ $R^5$ fast thereon, the sector $O^5$ coöperating with the arms $Q^5$ $R^5$, the rock-shaft J, and a connection between said shaft J and the sector $O^5$ by which movement of the shaft H from normal position and the engagement of one or the other of its arms $Q^5$ $R^5$ with the sector $O^5$ serves to lock the shaft J in normal position.

60. The combination of the rock-shaft J, the locking-arms $M^5$ $N^5$ fast thereon, the sector $K^5$ coöperating with said arms, the rock-shaft H, and a connection between said shaft H and the sector $K^5$ by which movement of the shaft J from normal position and the engagement of one or the other of its locking-arms with the sector $K^5$ serves to lock the shaft H in normal position.

61. The combination, with the platform of a railway-car and a gate and automatic registering or recording device controlling access to said platform by the steps at one side thereof, of the vestibule $A^9$ partially surrounding said platform at its outer edge and controlling access thereto except by the steps controlled by the gate and recording device, and provided at its middle, adjacent the outer edge of the platform, with the two gates $D^9$ adapted to be swung into position to either close the middle entrance to the platform or to form, in conjunction with similar gates on the adjacent car, when swung outward toward such car and beyond the edge of the platform, the sides of a closed passage-way communicating with said adjacent car, substantially as described.

CHARLTON MESSICK.

Witnesses:
FRANK NAY,
EDMOND GRIEVE.